US010459682B2

(12) United States Patent
Sundholm et al.

(10) Patent No.: US 10,459,682 B2
(45) Date of Patent: Oct. 29, 2019

(54) ELECTRONIC PRICE LABEL AND A BATTERY UNIT FOR AN ELECTRONIC PRICE LABEL

(71) Applicant: MARIELLA LABELS OY, Vantaa (FI)

(72) Inventors: Göran Sundholm, Tuusula (FI); Jenni Virnes, Helsinki (FI)

(73) Assignee: MARIELLA LABELS OY, Vantaa (FI)

( * ) Notice: Subject to any disclaimer, the term of this patent is extended or adjusted under 35 U.S.C. 154(b) by 4 days.

(21) Appl. No.: 15/542,575

(22) PCT Filed: Jan. 8, 2016

(86) PCT No.: PCT/FI2016/050005
§ 371 (c)(1),
(2) Date: Jul. 10, 2017

(87) PCT Pub. No.: WO2016/116663
PCT Pub. Date: Jul. 28, 2016

(65) Prior Publication Data
US 2018/0004472 A1    Jan. 4, 2018

(30) Foreign Application Priority Data

Jan. 19, 2015 (FI) .................. 20155037
Jan. 30, 2015 (FI) .................. 20155067

(51) Int. Cl.
*G06F 3/147* (2006.01)
*G06K 19/04* (2006.01)
(Continued)

(52) U.S. Cl.
CPC .......... *G06F 3/147* (2013.01); *G06K 19/04* (2013.01); *G09F 3/12* (2013.01); *G09F 3/20* (2013.01);
(Continued)

(58) Field of Classification Search
CPC . G06F 3/147; G06K 19/04; G09F 2003/0279; G09F 2003/0282;
(Continued)

(56) References Cited

U.S. PATENT DOCUMENTS 3,751,835 A * 8/1973 Smith ............... G09F 3/005
                                                  40/633
5,172,121 A * 12/1992 Beecher ............ B61L 25/04
                                                  342/44

(Continued)

FOREIGN PATENT DOCUMENTS

CN    101326539 A    12/2008
FI      20050192 A     8/2006
(Continued)

OTHER PUBLICATIONS

International Search Report, issued in PCT/FI2016/050005, dated Apr. 13, 2016.
(Continued)

*Primary Examiner* — Yong Hang Jiang
(74) *Attorney, Agent, or Firm* — Birch, Stewart, Kolasch & Birch, LLP

(57) ABSTRACT

Battery unit for an electronic price label and an electronic price label, which includes a separate, external, replaceable battery unit having a battery, and a fastening means, which may be detachably fasten the battery unit to the frame part of the electronic price label.

24 Claims, 14 Drawing Sheets

(51) Int. Cl.
*G09F 3/20* (2006.01)
*H01M 2/10* (2006.01)
*G09F 23/00* (2006.01)
*G09F 3/12* (2006.01)
*G09F 3/02* (2006.01)
*G09F 21/02* (2006.01)

(52) U.S. Cl.
CPC .......... *G09F 3/208* (2013.01); *G09F 23/0066* (2013.01); *H01M 2/1022* (2013.01); *H01M 2/1044* (2013.01); *G09F 2003/0279* (2013.01); *G09F 2003/0282* (2013.01); *G09F 2021/023* (2013.01); *G09G 2330/02* (2013.01); *G09G 2380/04* (2013.01); *H01M 2220/30* (2013.01)

(58) Field of Classification Search
CPC .. G09F 2021/023; G09F 23/0066; G09F 3/12; G09F 3/20; G09F 3/208; G09G 2330/02; G09G 2380/04; H01M 2220/30; H01M 2/1022; H01M 2/1044
USPC .................... 340/5.91, 572.1, 572.8
See application file for complete search history.

(56) References Cited

U.S. PATENT DOCUMENTS

| | | | | |
|---|---|---|---|---|
| 5,588,234 A * | 12/1996 | de Jong | ............... | A01K 11/004 40/301 |
| 5,650,766 A * | 7/1997 | Burgmann | ............. | G08B 21/22 200/DIG. 2 |
| 5,674,076 A * | 10/1997 | Billings | ................... | G10H 1/32 381/345 |
| 5,971,281 A * | 10/1999 | Frary | ..................... | G11B 17/22 235/385 |
| 6,461,757 B1 * | 10/2002 | Sasayama | ........... | H01M 2/0275 429/127 |
| 8,458,940 B2 * | 6/2013 | Davidson | .................. | G09F 3/04 2/145 |
| 2004/0077219 A1 * | 4/2004 | Wen-Yao | ........... | H01R 13/2421 439/638 |
| 2006/0163348 A1 | 7/2006 | Yoked et al. | | |
| 2008/0297350 A1 | 12/2008 | Iwasa et al. | | |
| 2009/0179825 A1 | 7/2009 | Enarvi et al. | | |
| 2009/0231101 A1 * | 9/2009 | Hyde | ...................... | H04Q 9/00 340/10.1 |
| 2009/0309736 A1 * | 12/2009 | Heurtier | ............... | G06K 19/041 340/572.8 |
| 2010/0259392 A1 | 10/2010 | Chamandy et al. | | |
| 2012/0120471 A1 | 5/2012 | Hämäläinen et al. | | |
| 2012/0182132 A1 * | 7/2012 | McShane | ........... | H01M 10/488 340/10.51 |
| 2013/0118043 A1 | 5/2013 | Favier et al. | | |
| 2015/0332615 A1 | 11/2015 | Sundholm | | |
| 2016/0291550 A1 * | 10/2016 | Chen | ....................... | H02J 50/10 |

FOREIGN PATENT DOCUMENTS

| | | |
|---|---|---|
| FI | 123635 B | 8/2013 |
| WO | WO 2009/103857 A1 | 8/2009 |
| WO | WO 2014/007733 A1 | 1/2014 |

OTHER PUBLICATIONS

Written Opinion of the International Searching Authority, issued in PCT/FI2016/050005, dated Apr. 13, 2016.
Chinese Office Action and Search Report, dated Mar. 8, 2019, for Chinese Application No. 201680005465.3, with an English translation.

* cited by examiner

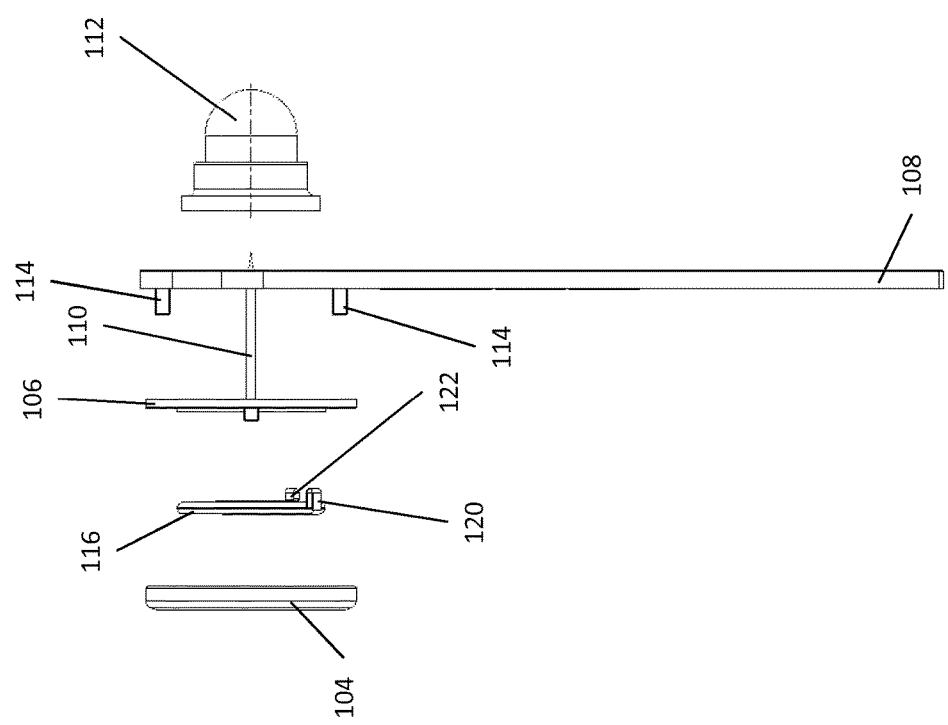

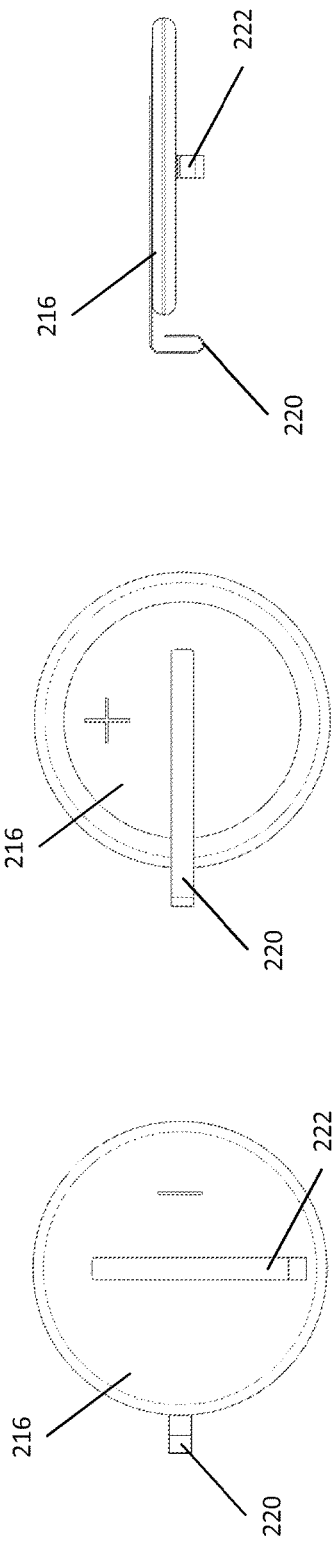
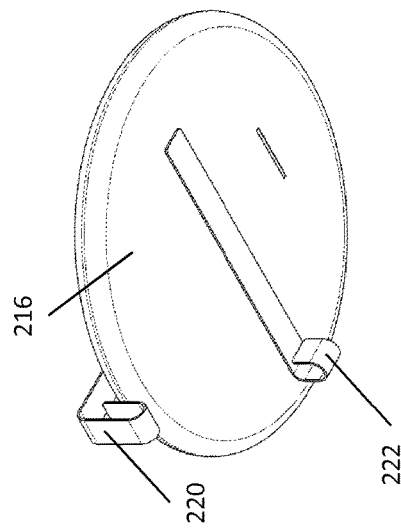
Fig. 2A
Fig. 2B
Fig. 2C
Fig. 2D
Fig. 2E

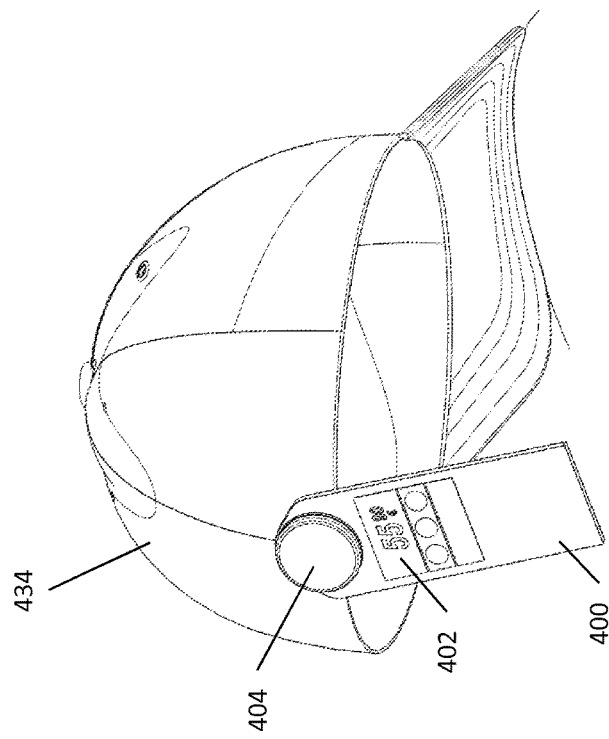
Fig. 4C
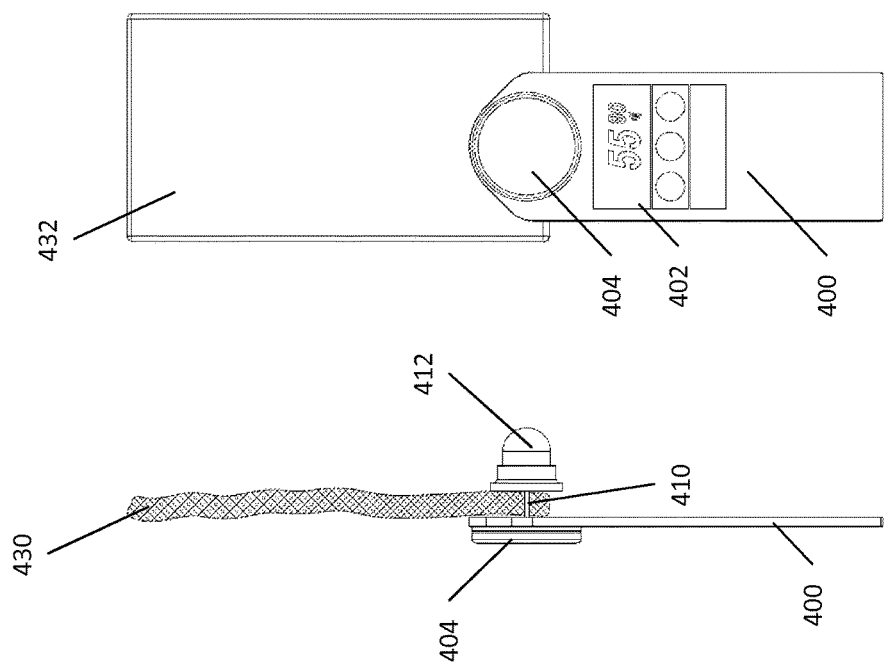
Fig. 4B
Fig. 4A

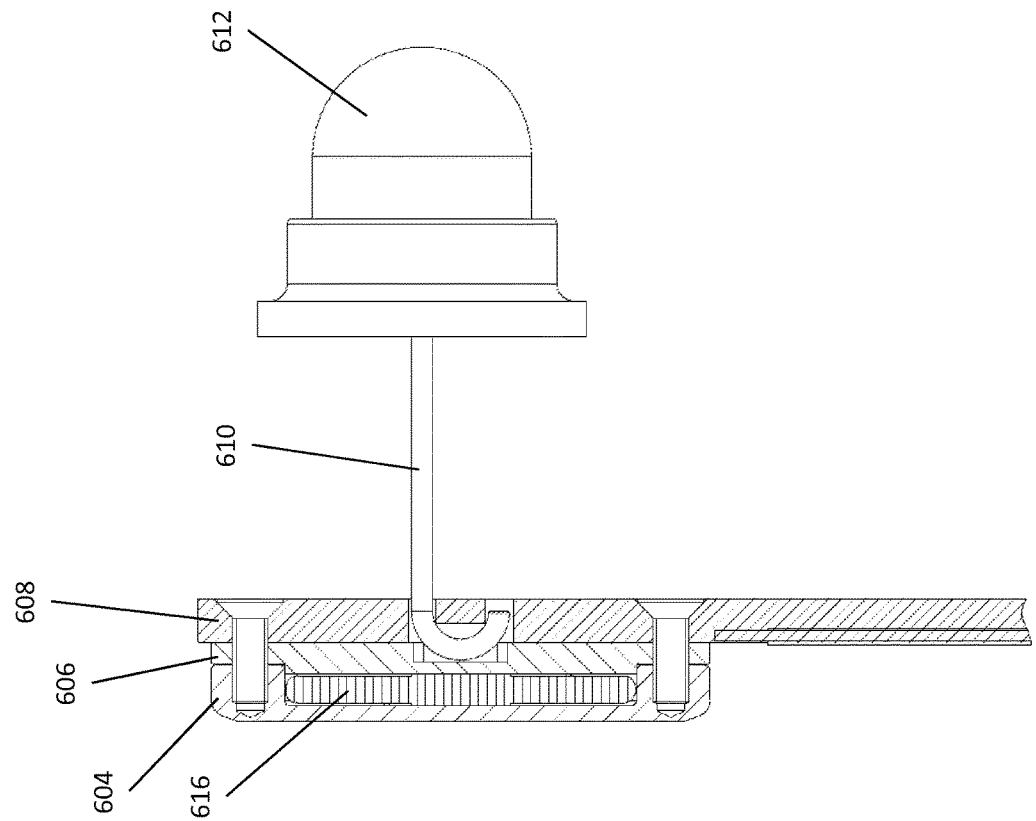
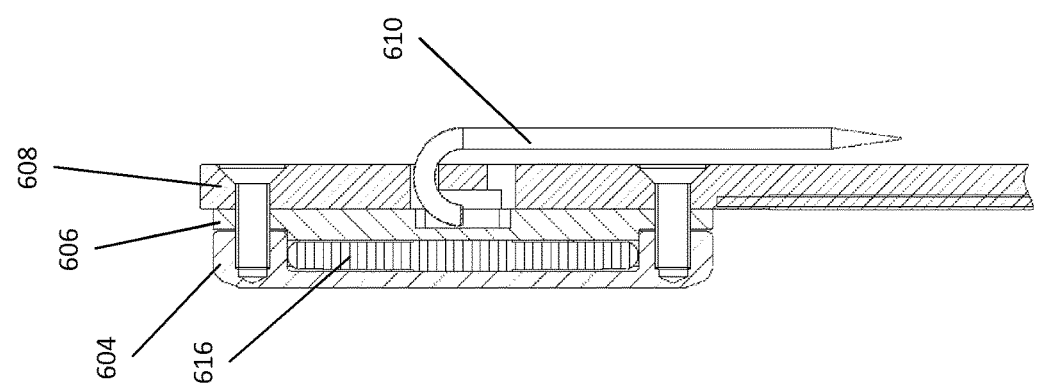
Fig. 6D
Fig. 6C

ELECTRONIC PRICE LABEL AND A BATTERY UNIT FOR AN ELECTRONIC PRICE LABEL

FIELD OF THE INVENTION

The invention relates to electronic price label systems. The invention relates more particularly to an electronic price label and to a fastening arrangement for the replaceable battery unit of it.

According to one embodiment of the invention the fastening arrangement for the replaceable battery unit according to the invention can be used e.g. in various electronic labels that are provided with an electronic display. These types of displays comprise e.g. electronic displays for showing the price information of products and other product information in retail stores and warehouses.

BACKGROUND OF THE INVENTION

Conventionally the price information of price labels is changed manually when the price of a product changes. New price labels are printed onto paper or onto a corresponding material and these labels, with their new price markings, are manually disposed in locations reserved on products or on shelves in sales premises. Consequently, an employee must first find the correct location of the price label to be updated and after this the previous price label is removed and discarded and the new price label is placed into its position. One drawback, among others, in this arrangement is that the arrangement is very laborious and the risk of errors is high. In the case of an error, e.g. a situation can arise in which the price information of a price label on the shelves is at variance with the price information of the checkout system.

In order to avoid the drawbacks described above, electronic systems have been developed wherein electronic labels are fastened onto the products or near the products, wherein the price information of the products can be changed centrally from the control center, or corresponding, of the system. This enables and significantly speeds up the updating of price information. The information on the displays can be updated in a wired or wireless manner, depending on the system.

Known from publication WO 2009/103857A1 is a system in which wireless electronic price labels are used. The properties of the wireless, layer-structured, electronic price labels presented in the publication are excellent. Some situations have arisen, however, in which the battery of a price label empties and it is desired to replace it.

Also known in the art are electronic price labels in which it is possible to replace the battery. These electronic price labels have a hard shell and replacement of the battery has been enabled by means of a hard battery enclosure inside the frame of the electronic price label. These price labels are structurally hard and inflexible and are not flexible like the electronic price labels known from publication WO2009103857. In the aforementioned solutions that are known in the art, therefore, the battery is disposed inside the frame part of the electronic price label. In this case the frame part of the price label must be formed to be of large thickness. The location of the battery inside the frame part also imposes other restrictions on the structure of the frame part of an electronic price label.

SUMMARY OF THE INVENTION

The aim of the invention is to reduce the aforementioned problems and to simultaneously enable an inexpensive and reliable electronic price label and fastening arrangement for a separate external battery unit of an electronic price label.

The invention is based on a concept, wherein an electronic price label comprises a separate and external battery unit, which comprises a battery. The arrangement further comprises a fastening means, which is adapted to detachably fasten the battery unit to the frame part of the electronic price label.

The solution according to the invention has a number of important advantages when it is compared to solutions known in the art. For example, when compared to the electronic price labels known in the art that are described e.g. in publication WO2009103857, the battery of a price label according to the invention can be replaced and thus the price label does not need to be replaced with a new price label e.g. always when the battery empties or fails. This saves costs as well as the natural environment.

On the other hand, when comparing the solution according to the invention to the electronic price labels known in the art in which a replaceable battery is disposed inside the frame structure of the electronic price label, the advantage of the present invention is that because the battery is installed onto and fastened to the exterior of the frame part, the frame part can be designed and formed without restrictions imposed by the battery. By means of the solution of the invention it is possible to form e.g. a lightweight electronic price label that is structurally thin, because the battery is not situated inside the frame part as it is in solutions known in the art.

In one embodiment of the invention the electronic price label comprises a first electrical connector part and a second electrical connector part that are fitted into connection with the frame part and a battery unit is adapted to be fastened to the frame part of the electronic price label in such a way that the connection poles of the battery of the battery unit are in electrical contact with the first electrical connector part and the second electrical connector part.

In one embodiment of the invention the transfer of energy and current from the battery to the electronic price label, and to the electrical parts of it, can be performed wirelessly. In this embodiment a direct physical electrical connection and conductors between the battery and the electrical parts of the electronic price label are not therefore needed, and electrical connectors on the surface of the frame part of the electronic price label and/or of the intermediate part or of the entity formed by the intermediate part and the protective casing are not needed either.

In one embodiment of the invention the battery unit further comprises a protective casing of the battery and/or an intermediate part, which can be fastened between the battery and the frame part of the electronic price label.

In one embodiment of the invention the electronic price label comprises a fastening means and/or a lock part for fastening the electronic price label to a product. The fastening means can be e.g. a stud or spike and the lock part can be e.g. a magnetic lock. An advantage of this embodiment is that the electronic price label can be easily fastened to a product in this way.

In one embodiment of the invention the fastening means for fastening the battery unit to the electronic price label is a separate fastening means such as e.g. a screw. In another embodiment of the invention the fastening means for fastening the battery unit to the electronic price label is arranged in the structure of the battery unit or in connection with it, e.g. in the structure of the protective casing or in connection with it and/or in the structure of the intermediate part or in connection with it. In one embodiment of the invention the fastening means is formed from both the fastening means described in the preceding. In one embodiment of the invention the fastening means and/or the lock part of an electronic price label to be fastened to a product is arranged to function as a fastening means fastening the battery unit to the electronic price label.

In one embodiment of the invention the electronic price label further comprises a second fastening means, which is arranged to fasten the protective casing of the battery to the intermediate part. This is an advantage when replacing the battery because the battery unit assembly formed by the protective casing and intermediate part is easier to replace when there are not many detachable small parts in the structure.

DESCRIPTION OF THE FIGURES

In the following, the invention will be described in more detail by the aid of some examples of its embodiment with reference to the attached drawings, wherein FIG. 1G presents an explosion drawing of the structure of an electronic price label according to one embodiment of the invention as seen from the side, FIG. 2A presents the battery part of an electronic price label according to one embodiment of the invention as viewed from below, FIG. 2B presents the battery part of an electronic price label according to one embodiment of the invention as viewed from above, FIG. 2C presents the battery part of an electronic price label according to one embodiment of the invention as viewed from the side, FIG. 2D presents the battery part of an electronic price label according to one embodiment of the invention as viewed obliquely from above, FIG. 2E presents the battery part of an electronic price label according to one embodiment of the invention as viewed obliquely from below, FIGS. 4A-C present the fastening of a price label according to one embodiment of the invention to a product.

FIG. 6C presents a magnified view of the structure of an electronic price label according to one embodiment of the invention as a cross-section, and FIG. 6D presents a magnified view of the structure of an electronic price label according to one embodiment of the invention as a cross-section.

DETAILED DESCRIPTION OF THE INVENTION

Figure 1B:
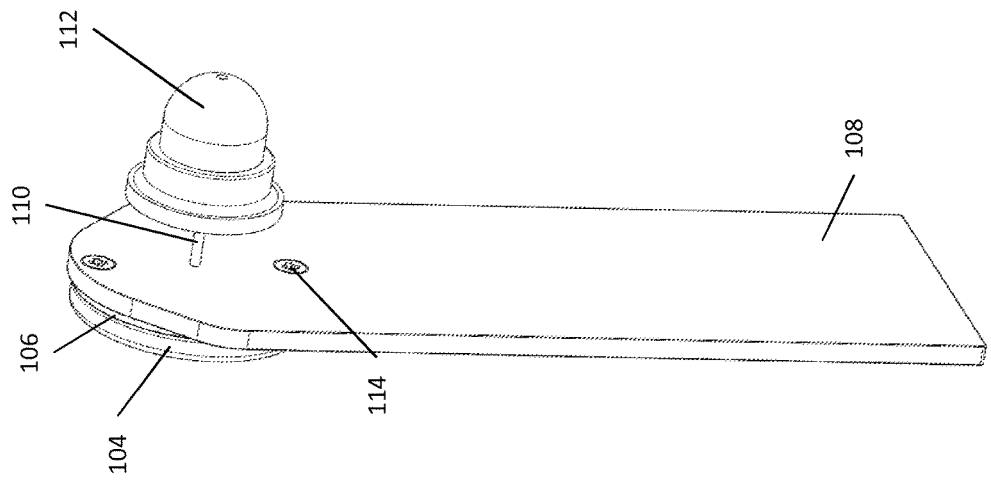
FIG. 1B presents the structure of an electronic price label according to one embodiment of the invention as seen obliquely from the rear.
Figure 1A:
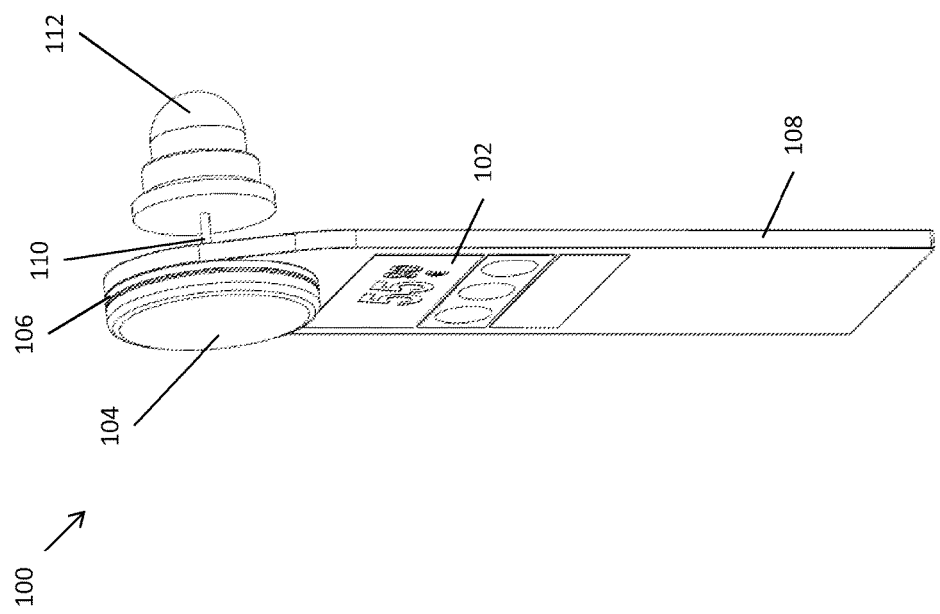
FIG. 1A presents the structure of an electronic price label according to one embodiment of the invention as seen obliquely from the front.
Figure 1D:
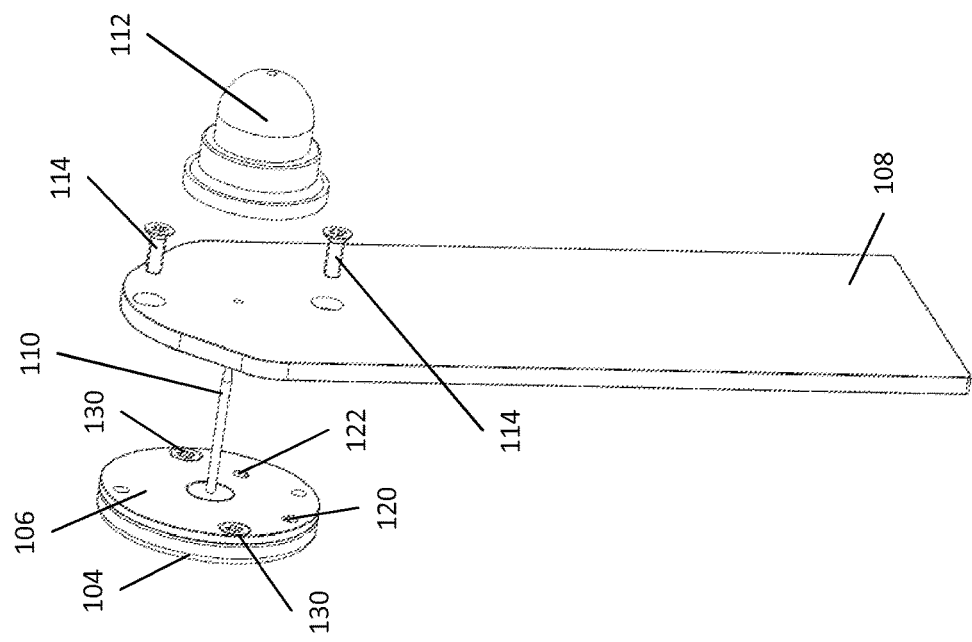
FIG. 1D presents an explosion drawing of the structure of an electronic price label according to one embodiment of the invention as seen obliquely from the rear.
Figure 1C:
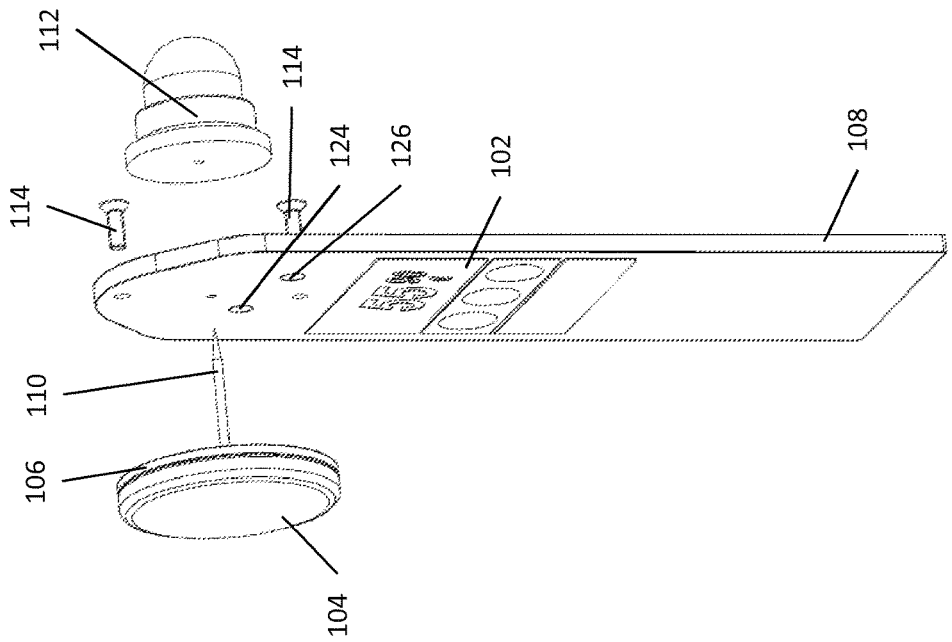
FIG. 1C presents an explosion drawing of the structure of an electronic price label according to one embodiment of the invention as seen obliquely from the front.

FIGS. 1A-1K present a diagrammatic and simplified view of an electronic price label 100 according to the invention and of the battery fastening arrangement to be connected to it. FIG. 1A presents an electronic price label as viewed obliquely from the front, and FIG. 1B an electronic price label as viewed obliquely from behind.

An electronic price label 100 typically comprises a laminate display 102, which is arranged to display the price information and/or product information of a product. Also other information relating to a product, such as e.g. the name of the product, can be presented on the front surface of an electronic price label. The frame part 108 of an electronic label can, in terms of its material and structure, be hard or, alternatively, elastic and flexible. The electronics of an electronic price label can be disposed inside the frame part 108 or in connection with it. The display 102 of an electronic price label is provided with display segments or pixels. An electronic price label 100 resembles a price label of paper, on which the required prices of products and other necessary symbols are formed by changing the colors of the segments or pixels of an essentially dichromatic display 102. In one embodiment of the invention the display can be multicolored.

One layer of the display 102 is e.g. an active ink layer. The ink layer contains a number of microcapsules, which are filled with a liquid and which contain e.g. essentially black particles, which have a positive surface charge and the location of which is controlled with an electrical field in such a way that in the desired display segments the black particles are on, wherein the aforementioned display segment appears black when it is viewed from above, and in the other display segments the white particles are on, wherein these display segments appear white when viewed from above. The background of the display 102 is formed from the same microcapsules, wherein e.g. price information can be displayed as dark numbers against a light background or, if so desired, vice versa. This type of display, which is used, can be an electrophoretic microcapsule display laminate described e.g. in Finnish patent application FI 20050192.

FIGS. 1A-1K also present a battery unit according to one embodiment of the invention, which battery unit comprises a protective casing 104 of the battery, the casing forming a recess for the battery 116. In the solution according to the invention the protective casing 104 is adapted to be detachably fastened onto the outer surface of the electronic price label in such a way that a battery 106 that can be placed in the recess formed by the protective casing remains in connection with the electronic price label, and the connection poles of the battery are in continuous electrical contact with the electrical connector parts 124, 126 of the electronic price label. The electrical connector parts fitted into connection with an electronic price label and/or the means for conducting current 120, 122 fitted into connection with them are arranged in such a way that they conduct current from the connection poles of a replaceable battery to the circuit board and/or display of the electronic price label. In one embodiment of the invention the surface of the electronic price label is essentially planar and the protective casing of the battery is adapted to be fastened onto the essentially planar surface of the price label.

In the embodiment presented in FIGS. 1A-1K, the protective casing 104 of the battery has been fastened to the electronic price label with first screws 114. The first fastening means used for fastening the protective casing of the battery can also be other fastening means. In one embodiment of the invention the fastening means for fastening the protective casing to the electronic price label is a separate fastening means. In another embodiment of the invention the fastening means for fastening the protective casing to the electronic price label is arranged in the structure of the protective casing or in connection with it. In this embodiment the fastening means can be e.g. a protrusion on the protective casing and/or a tongue on the protrusion, in which case in the electronic price label there can be a hole for the protrusion, and the protective casing can be snapped into position attached to the electronic price label. A fastening means, such as screws, can be disposed in such a way that they are not visible and that they cannot be detached when the price label is fastened to a product.

The electronic price label can also have a fastening means 110 and/or a lock part 112 for fastening the electronic price label to a product. The frame part 108 of the electronic price label can have an aperture, through which the fastening means can be fitted. The fastening means 110 can be e.g. a stud or spike and the lock part 112 can be e.g. a magnetic lock. In one embodiment of the invention the fastening means and/or the lock part is/are arranged to function as a fastening means fastening the protective casing to the electronic price label. The fastening means is disposed in the solution of the invention in such a way that it cannot be detached without removing the battery unit.

In one embodiment of the invention the arrangement can also comprise an intermediate part 106. In the embodiment presented by FIGS. 1A-1K the intermediate part 106 is arranged at least partly between the protective casing 104 of the battery and the frame part 108 of the electronic price label and/or the battery. The intermediate part 106 can also be fitted into connection with the fastening means 110. In one embodiment of the invention the fastening means for fastening the protective casing to the electronic price label is arranged in the structure of the intermediate part 106 or in connection with it.

In one embodiment of the invention the protective casing 104 of the battery is fastened to the intermediate part with second screws 130. The second fastening means used for fastening the protective casing of the battery to the intermediate part can also be other fastening means. In one embodiment of the invention the fastening means for fastening the protective casing to the intermediate part is a separate fastening means. In another embodiment of the invention a fastening means for fastening the protective casing to the intermediate part is arranged in the structure of the protective casing or in connection with it and/or in the structure of the intermediate part or in connection with it. In this embodiment the fastening means can be e.g. a protrusion on the protective casing and/or on the intermediate part and/or a tongue on the protrusion, in which case in the intermediate part and/or in the protective casing there can be a hole for the protrusion, and the protective casing can be snapped into position attached to the intermediate part.

Figure 1F:
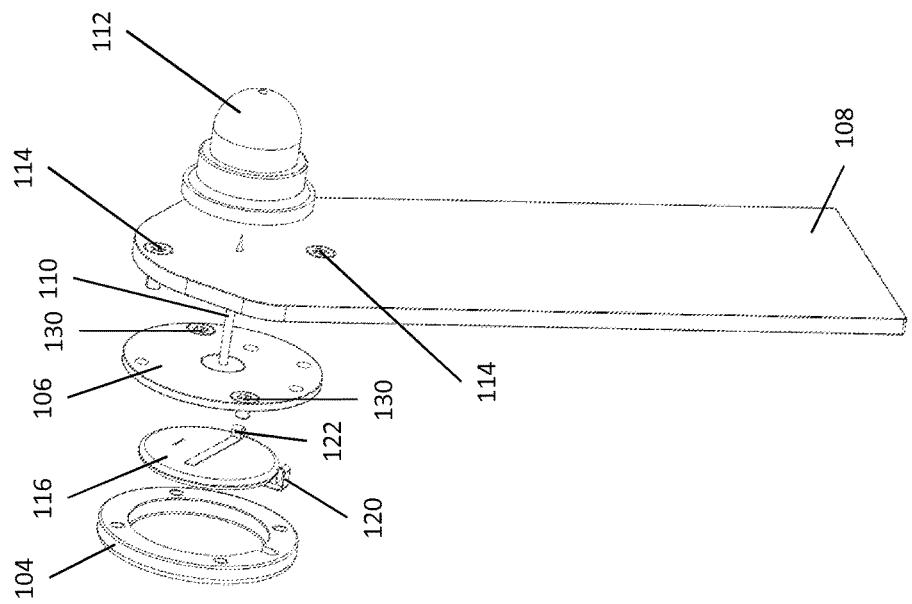
FIG. 1F presents an explosion drawing of the structure of an electronic price label according to one embodiment of the invention as seen obliquely from the rear.
Figure 1E:
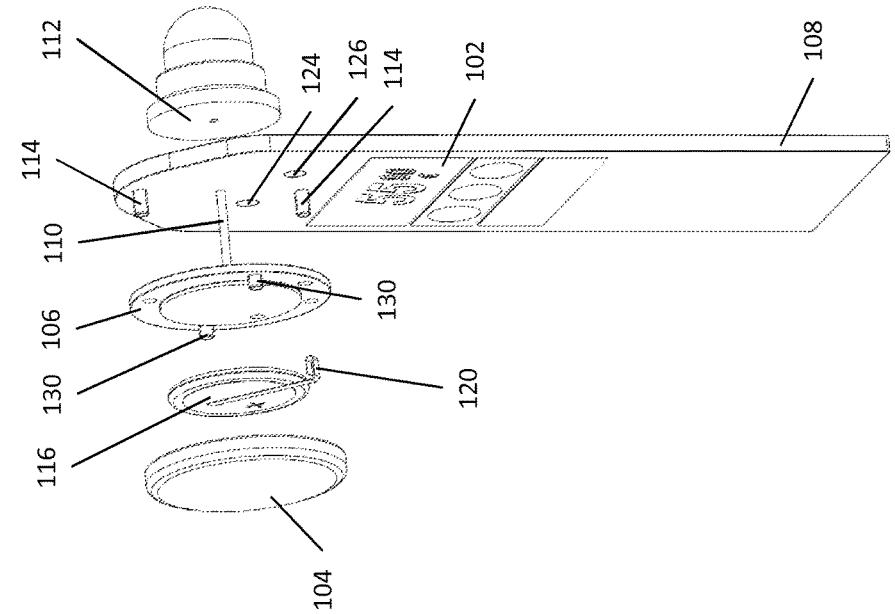
FIG. 1E presents an explosion drawing of the structure of an electronic price label according to one embodiment of the invention as seen obliquely from the front.

The structure of the intermediate part is presented in more detail in FIGS. 1E and 1F. The figures in question present an explosion drawing of the structure of a solution according one embodiment of the arrangement according to the invention. The protective casing 104 of the battery forms a recess for a replaceable battery 116 in such a way that a space open on one side is formed inside the protective casing 104, the space essentially surrounding a replaceable battery 116 being installed in the recess when the battery 116 is installed into position.

The protective casing 104 can further comprise means for conducting current from at least one connection pole of the battery 116 to an electrical connector part of the electronic price label or a space for means for conducting current. Also the intermediate part 106 can comprise means for conducting current from at least one connection pole of the battery 116 to an electrical connector part of the electronic price label. In the embodiment presented in FIGS. 1A-1K the means for conducting current 120, 122 from a connection pole or connection poles of the battery 116 to a first electrical connector part and/or to a second electrical connector part of the electronic price label are arranged in connection with the battery and in this case separate means for conducting current are not necessarily needed in the protective casing 104 and/or in the intermediate part 106. The means for conducting current 220, 222 can be fixed to the battery e.g. by welding. The means for conducting current can be at least partly spring-type, e.g. springs or a type of pogo pin, or they can form a spring means.

Figure 1I:
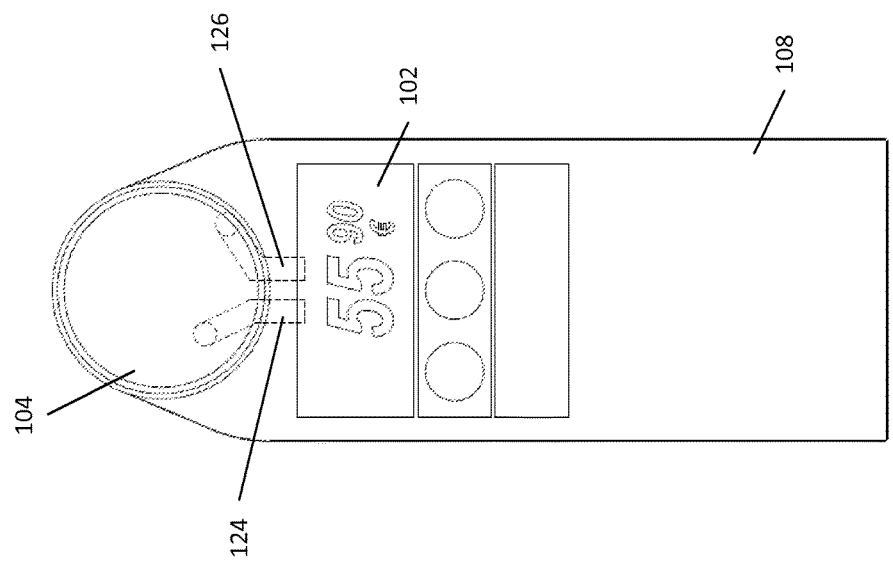
FIG. 1I presents a structure of an electronic price label according to one embodiment of the invention as seen from the front side of the electronic price label.
Figure 1H:
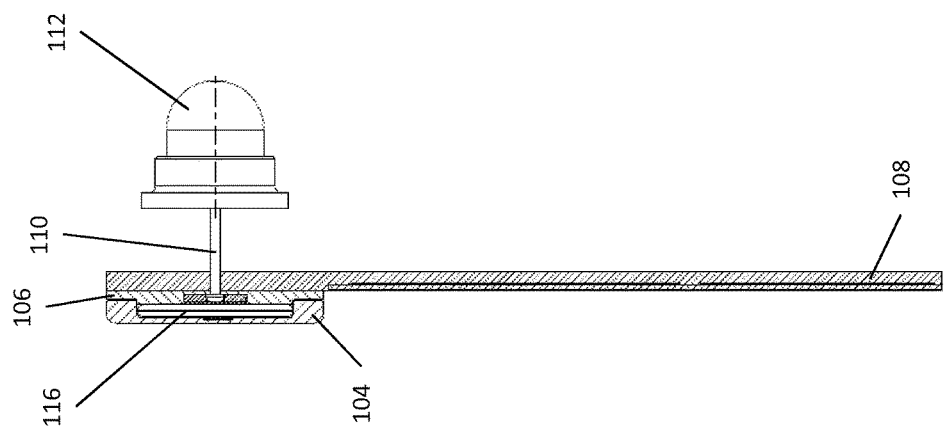
FIG. 1H presents the structure of an electronic price label according to one embodiment of the invention as a cross-section.
Figure 1K:
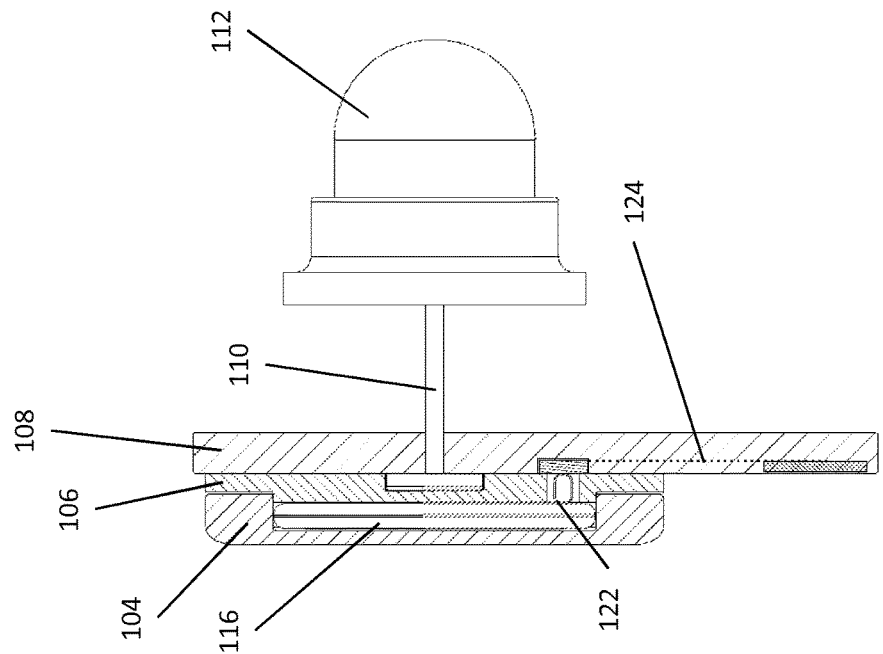
FIG. 1K presents a magnified view of the structure of an electronic price label according to one embodiment of the invention as a cross-section.
Figure 1J:
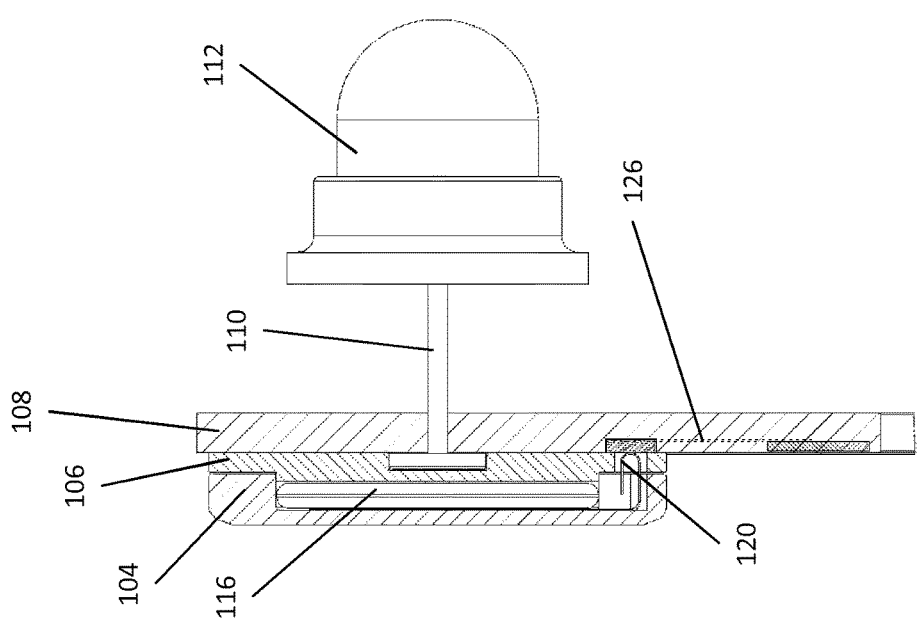
FIG. 1J presents a magnified view of the structure of an electronic price label according to one embodiment of the invention as a cross-section.
Figure 3B:
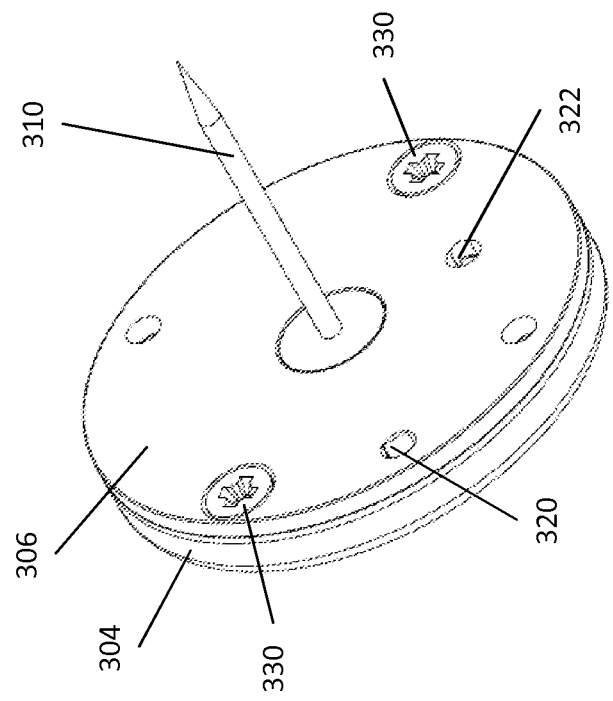
FIG. 3B presents the structure of the battery unit of an electronic price label according to one embodiment of the invention as seen obliquely from the rear.
Figure 3A:
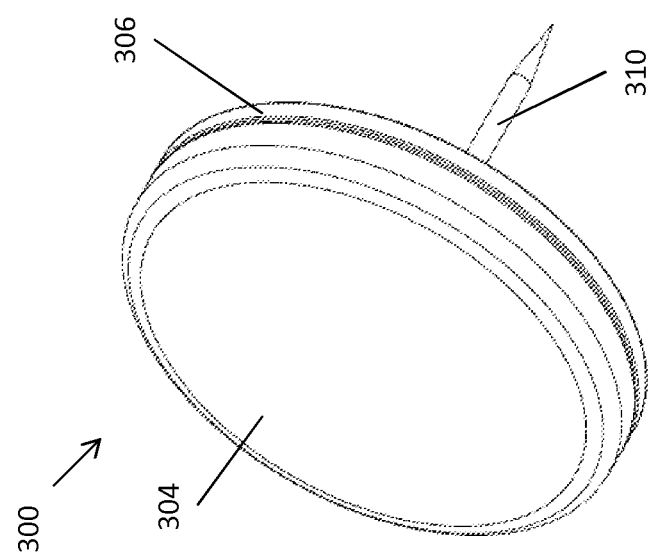
FIG. 3A presents the structure of the battery unit of an electronic price label according to one embodiment of the invention as seen obliquely from the front.
Figure 3D:
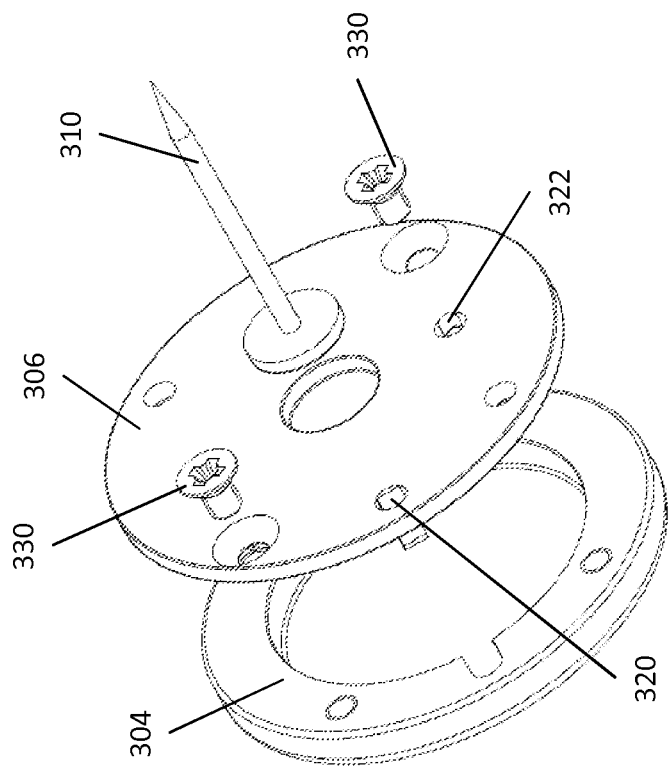
FIG. 3D presents an explosion drawing of the structure of the battery unit of an electronic price label according to one embodiment of the invention as seen obliquely from the rear.
Figure 3C:
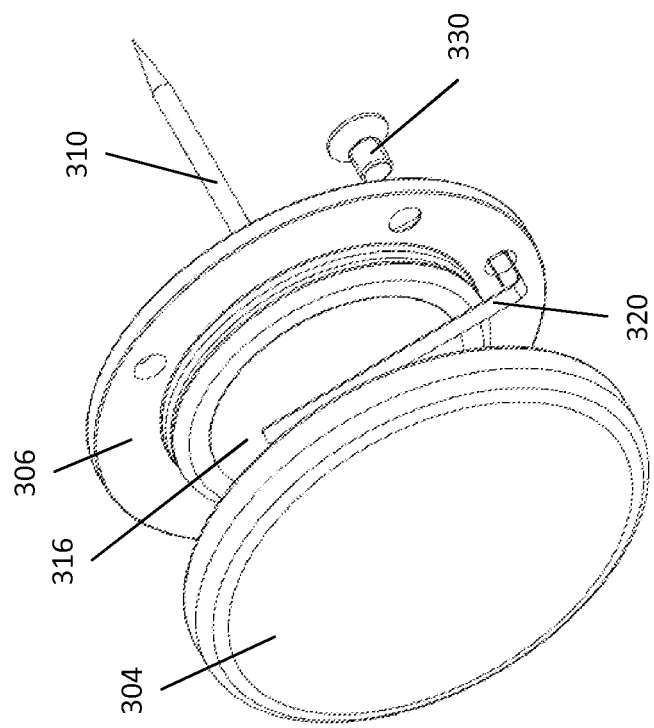
FIG. 3C presents an explosion drawing of the structure of the battery unit of an electronic price label according to one embodiment of the invention as seen obliquely from the front.
Figure 5B:
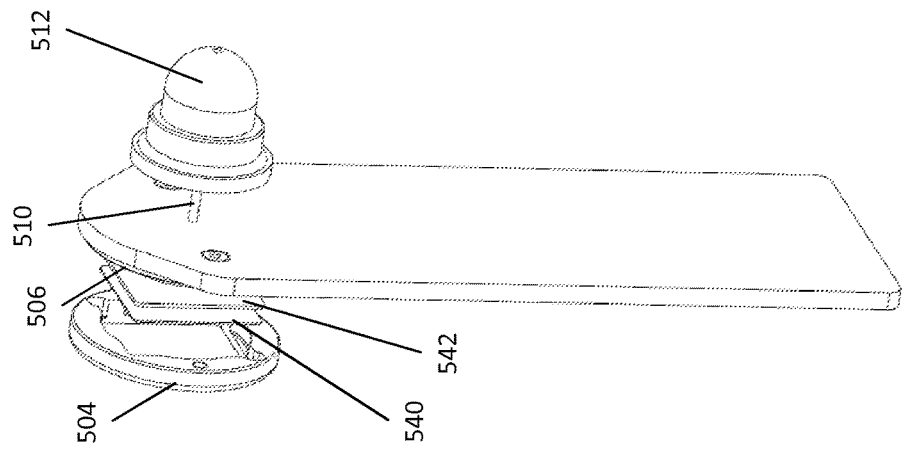
FIG. 5B presents an explosion drawing of the structure of an electronic price label according to one embodiment of the invention as seen obliquely from the rear, wherein a remotely readable identifier is integrated into the electronic price label.
Figure 5A:
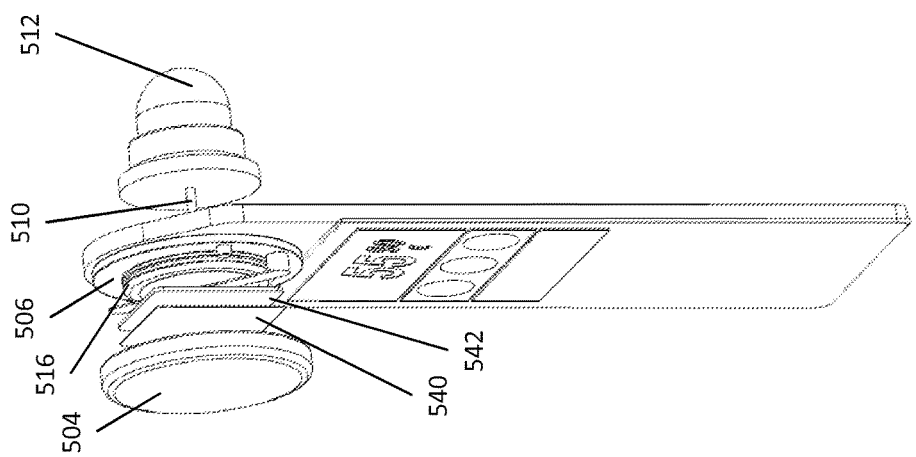
FIG. 5A presents an explosion drawing of the structure of an electronic price label according to one embodiment of the invention as seen obliquely from the front, wherein a remotely readable identifier is integrated into the electronic price label.
Figure 5D:
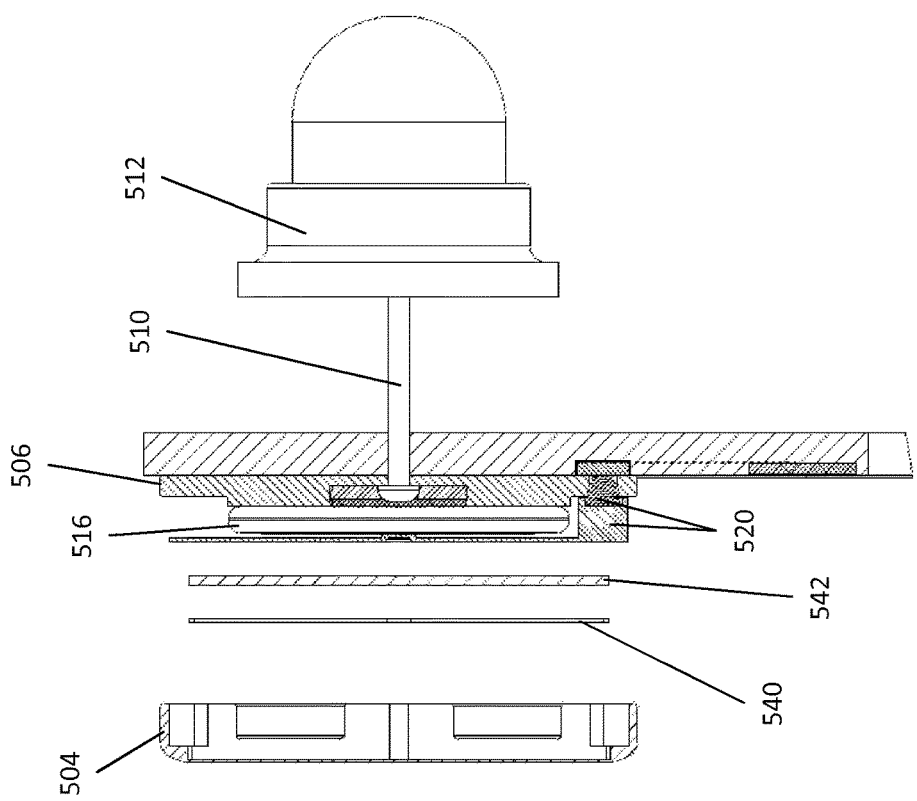
FIG. 5D presents an explosion drawing of the structure of an electronic price label according to one embodiment of the invention as a cross-section, wherein a remotely readable identifier is integrated into the electronic price label.
Figure 5C:
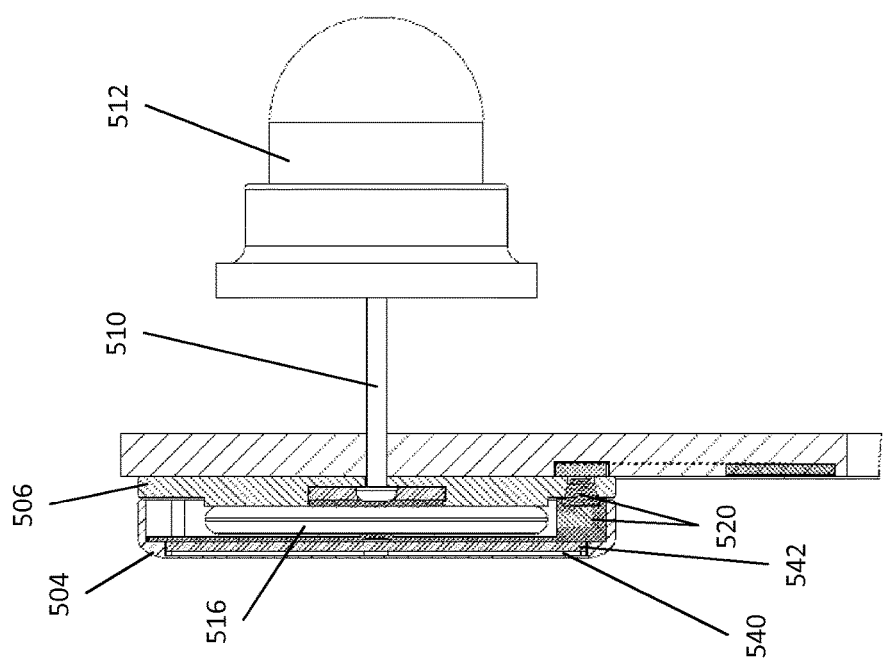
FIG. 5C presents a magnified view of the structure of an electronic price label according to one embodiment of the invention as a cross-section, wherein a remotely readable identifier is integrated into the electronic price label.
Figure 6B:
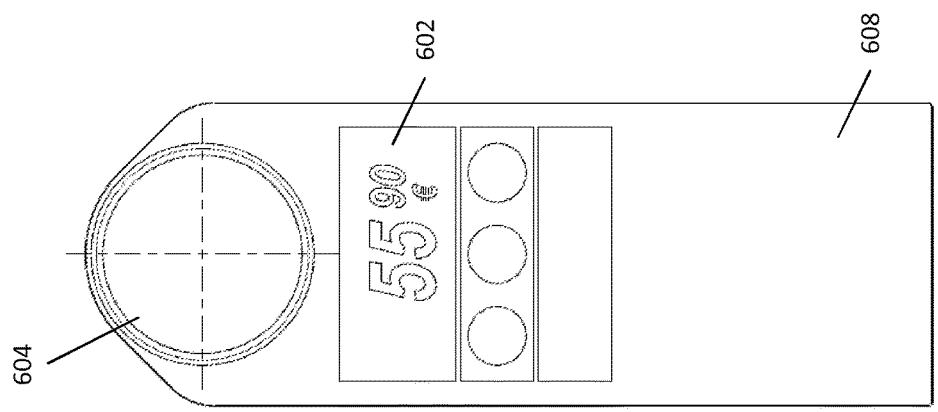
FIG. 6B presents the structure of an electronic price label according to one embodiment of the invention as seen from the front side of the electronic price label.
Figure 6A:
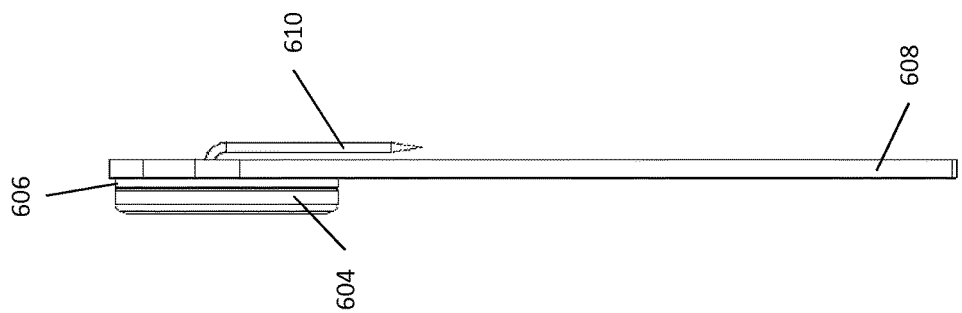
FIG. 6A presents the structure of an electronic price label according to one embodiment of the invention as a cross-section.

By means of the structure according to the invention a continuous and reliable electrical contact can be formed from the connection poles of the battery 116 to the first electrical connector part 124 and/or to the second electrical connector part 126 of the electronic price label. FIGS. 1J and 1K present how in this embodiment the one battery 116 is electrically connected from its connection poles to the first electrical connector 124 of the electronic price label by the aid of first means for conducting current 122 that are in connection with the battery, and the other battery 116 is electrically connected from its connection poles to the second electrical connector 126 of the electronic price label by the aid of second means for conducting current 120 that are in connection with the battery. The FIGS. 1J and 1K in question present the structure of the arrangement and of the electronic price label as a cross-section at the points corresponding to the electrical connector parts 124, 126, of which the cross-section in FIG. 1J is made at the point of the second connector part 126 and in FIG. 1K at the point of the first electrically conductive connector part 124. The electrical connector parts 124, 126 presented in FIGS. 1C, 1E, 1I, 1J and 1K connect the connection poles of the battery to the electrical parts of the electronic price label, such as to the circuit board and/or to the display. FIGS. 1I, 1J and 1K present by way of example how the electrical connector parts 124, 126 can be situated inside the structure of the frame part of the price label.

In one embodiment of the invention there are alignment parts in the electronic price label, in the protective casing of the replaceable battery and/or in the intermediate part, by means of which alignment parts the aforementioned parts always become installed in the correct attitude.

FIGS. 2A-2E present a replaceable battery part according to one embodiment of the invention, the part comprising a battery 216, first means for conducting current 220 and second means for conducting current 222. The means for conducting current 220, 222 can be rigidly fixed to the battery 216. In this case the entity formed by the battery 216 and the means for conducting current 220, 222 is easy to replace in an electronic price label and a reliable electrical contact forms between the battery 216 and the means for conducting current 220, 222. The means for conducting current 220, 222 are arranged in such a way that when the battery is installed into position in the electronic price label, the means for conducting current form an electrical connection between the connection poles of the battery 216 and the electrical connector parts of the electronic price label. The means for conducting current 220, 222 presented in FIGS. 2A-2B are similar to those in the embodiment presented in FIGS. 1A-1K. That being the case, they can also be at least partly spring-type, e.g. springs or a type of pogo pin, or they can form a spring means.

FIGS. 3A-3D present a battery unit 300 according to one embodiment of the invention, by means of which an electronic price label can be fastened to a product and by means of which the battery can be electrically connected to the price label. A battery unit 300 is formed from a battery 316, on the one side of which is disposed a protective casing for the battery and on the other side of which an intermediate part 306 and a fastening means 310 fitted into connection with the intermediate part. An electrical contact from the connection poles of the battery to the electronic price label is formed with the means for conducting current 320, 322, which means can be in connection with the battery 316. The aforementioned parts are similar in the solution of this embodiment to those in the embodiment presented in FIGS. 1A-1K. In one embodiment of the invention the battery unit does not comprise a fastening means.

In the embodiment presented in FIGS. 3A-3D the intermediate part 306 and/or the protective casing 304 of the battery can be fastened with first fastening means to the electronic price label and with second fastening means to the protective casing of the battery. In the embodiment presented in FIGS. 3A-3D the intermediate part 306 is fastened with two screws 330 to the protective casing of the battery, in which case the battery 316, intermediate part 306 and protective casing 304 of the battery form an entity. After this, the entity formed by the battery 316, intermediate part 306 and the protective casing 304 of the battery can be further fastened with screws, e.g. with two first screws, to the electronic price label. In the intermediate part 306 is a recess for the fastening means 310 and when the fastening means 310 is placed in the recess and after this pushed through the aperture of the electronic price label, the fastening means remains attached to, and in position in, the electronic price label and the fastening arrangement between the intermediate part 306 and the electronic price label when the entity formed by the battery, the intermediate part and the protective casing of the battery is fastened into the electronic price label. Since the intermediate part and the protective casing of the battery are fastened to each other, the entity formed by the battery, intermediate part and protective casing of the battery is easy to replace in an electronic price label e.g. when the battery is exhausted. Owing to the structure, a user does not lose the parts of the fastening arrangement of the battery.

The battery unit 300 presented in FIGS. 3A-3D can be delivered to the bodies using the electronic price labels or to retail stores as prefabricated units, in which case replacement of the battery of the price labels is easy and rapid. The battery unit can be fixed to the price label e.g. in such a way that the fastening means is pushed through the electronic price label, or through an aperture in the electronic price label, and at the same time the fastening means is pushed into a locking part, by means of which the battery unit is tightly fastened to the electronic price label. If a magnetic lock is used as a locking part, the fastening can be opened with a magnetic lock opener, such as are used e.g. at checkout counters for removing theft alarms. Other types of fastening means, such as using screws, for fastening the battery unit to the price label are also possible.

FIGS. 4A-4C present how an electronic price label 400 according to the invention, the label having a battery unit comprising a protective cover 404, can be fastened to a product 430, 432, 434 by means of a fastening means 410 and a locking part 412. In this case the fastening means 410 is pushed through the product 430, 432, 434 or through an aperture in the product 430, 432, 434 and a locking part 412 is fastened to the second end of the fastening means 410, the locking part opening only with an opener intended for it. In this way an electronic price label remains reliably attached to a product but can easily be removed from the product with appropriate proper openers, e.g. at the checkout counter. In this case if the electronic price label and/or the locking part comprises a component of a theft alarm system, the component can be removed at the checkout counter. The product 430, 432, 434 can be e.g. an article of clothing.

The embodiment presented in FIGS. 5A-5D is otherwise similar to the embodiments presented in the previous figures but the embodiment of the fastening arrangement of the electronic price label presented in FIGS. 5A-5D also comprises a remotely readable identifier 540, such as e.g. an RFID identifier. An insulation part 542 can also be in connection with the remotely readable identifier 540. The insulation part 542 can be planar and it can be disposed between the battery 516 and the remotely readable identifier 540, in which case the insulation part 542 insulates the remotely readable identifier 540 from the battery 516. The insulation part 542 can be of e.g. plastic material. The remotely readable identifier 540 is arranged in connection with the protective casing 504 of the battery and on the base of it in such a way that both the remotely readable identifier 540 and the battery 516 can be fitted inside the protective casing. In this embodiment also the fastening arrangement can comprise an intermediate part 506 and a fastening means 510 and also a locking part 512.

The means for conducting current 520, of the embodiment presented in FIGS. 5A-5D, from a connection pole of a replaceable battery to the electronic price label are arranged in connection with the protective casing and the intermediate part but, in the case of a price label comprising a remotely readable identifier, similar means as in the other embodiments can also be used for conducting current from the connection poles of a battery to the electronic price label.

An advantage of the embodiment presented in FIGS. 5A-5D is that a remotely readable identifier, such as an RFID identifier, enables additional functionalities for the electronic price label, such as e.g. anti-theft functionality. In addition to this, because the remotely readable identifier is in the top part of the electronic price label, the antenna of the electronic price label system can be arranged in the bottom part of the price label, and in this case the remotely readable identifier interferes with the antenna of the electronic price label system as little as possible because the antenna and the remotely readable identifier are the farthest distance apart from each other as possible.

The embodiment presented in FIGS. 6A-6D is otherwise similar to the embodiments presented in the previous figures but the fastening means 610 of the embodiment of the fastening arrangement of the electronic price label presented in FIGS. 6A-6D can be bent downwards, in which case during delivery and storage the electronic price label, which comprises a protective casing 604 of the battery, a battery 616, an intermediate part 606 and a battery unit comprising a fastening means 610, is compact in its dimensions when the fastening means 610 has been bent downwards against the frame part 608 of the electronic price label.

FIG. 6D presents how the fastening means 610 can be turned to be perpendicular relative to the frame part 604 of the electronic price label when it is desired to fasten the electronic price label to a product, and in this case a locking part 612 can be installed onto the end of the fastening means 610, by means of which the electronic price label can be locked to a product.

The fastening means 610, the frame part 608 of the electronic price label, the battery unit and/or the intermediate part 606 of the battery unit of the embodiment presented in FIGS. 6A-6D are arranged in such a way that the fastening means 610 remains attached to the electronic price label but can at the same time be turned from a first position in connection with the frame part 608 into a second position at a right angle to the frame part 608 and, if so desired, back into the first position in connection with the frame part 608. This can be implemented e.g. in the manner described in the figure, in which case the end of the fastening means 610, which is in connection with the electronic price label and the battery unit, is shaped to be semicircular and apertures and/or a space for the fastening means 610 are arranged in suitable locations in the frame part 608 of the electronic price label, in the battery unit and/or in the intermediate part 606. The apertures and/or space can be arranged in such a way that the semicircular end of the fastening means 610 fits to turn between its extreme positions. In one embodiment of the invention the fastening means 610, apertures and/or space are arranged in such a way that the fastening means 610 locks into position when it is in a perpendicular attitude relative to the frame part 608 of the electronic price label.

In one embodiment of the invention another replaceable voltage source, such as an accumulator, can be used instead of a battery.

In one embodiment of the invention the transfer of energy and current from the battery to the electronic price label, and to the electrical parts of it, can be performed wirelessly. This can be effected e.g. on the principle of inductive charging, wherein the induction of an electromagnet enables the transmission of energy over short distances via an inductive coupling. In this case in connection with the battery is a primary loop or a primary winding, and in connection with the electronic price label and/or with the electrical connector parts of the electronic price label is a secondary loop or secondary winding. In this way energy can be transferred via the primary loop or primary winding to the secondary loop or secondary winding, which is connected electrically to the electrical parts of the electronic price label, such as to e.g. a circuit board and/or a display. In this embodiment a direct physical electrical connection between the battery and the electrical parts of the electronic price label are not therefore needed and electrical connectors on the surface of the frame part of the electronic price label and/or of the intermediate part or of the entity formed by the intermediate part and the protective casing are not needed either. In this way a simpler structure is obtained, and replacement of the battery and the assembly surrounding it is easier because it is sufficient that the battery is brought to the correct position and distance from the electronic price label but it does not need to be positioned so precisely as when an electrical contact is formed by the aid of physical means for conducting current. Also the risk of damaging the connectors is minimized because the connectors do not need to be visible.

In one embodiment of the invention, the electronic price label comprises a memory, which is adapted to retain information when the current is disconnected. The memory can be e.g. EEPROM (Electronically Erasable Programmable Read-Only Memory) memory. By means of the memory the information in the memory of the electronic label is retained also during replacement of the battery and the electronic price label does not have to be reprogrammed after replacement of the battery.

In one embodiment of the invention the frame part, front surface and/or rear surface of the electronic price label is essentially flexible. In one embodiment of the invention the frame part, front surface and/or rear surface of the price label is essentially hard and inflexible.

In one embodiment of the invention the protective casing is at least partly translucent and in connection with the battery and inside the protective casing is arranged e.g. a solar cell, by means of which the battery can be charged when sunlight or other light falls upon it. In another embodiment of the invention the protective casing of the battery does not need to be transparent but instead the solar cell is fitted to the outer surface of the protective casing and connected with conductors to the battery and/or to its charging arrangement.

It is obvious to the person skilled in the art that the invention is not limited to the embodiments presented above, but that it can be varied within the scope of the claims presented below. The characteristic features presented in the description mentioned in conjunction with each other can also be independent characteristic features.

The invention claimed is:

1. An electronic price label, comprising:
   a frame part of the electronic price label;
   a separate, external, replaceable battery unit, which comprises a battery; and
   a first fastener, which is adapted to detachably fasten the battery unit to the frame part of the electronic price label or into connection with said frame part,
   wherein the first fastener comprises a stud or spike for fastening the electronic price label to a product, and
   wherein the first fastener, the frame part of the electronic price label and/or the battery unit are arranged so that the first fastener can be turned into a first position in a direction of the frame part and into a second position at a right angle to the frame part.

2. The electronic price label according to claim 1, further comprising a first electrical connector part and a second electrical connector part fitted into connection with the frame part, and
   wherein the first fastener detachably fastens the battery unit to the frame part of the electronic price label in such a way that connection poles of the battery of the battery unit are in electrical contact with the first electrical connector part and the second electrical connector part.

3. The electronic price label according to claim 2, wherein the connection poles of the battery are in continuous electrical contact with the first electrical connector part and the second electrical connector part.

4. The electronic price label according to claim 2, further comprising conductors for conducting current from the connection poles of the battery to the first electrical connector part and to the second electrical connector part of the electronic price label, and the connection poles of the battery are in continuous electrical contact with the first electrical connector part and/or the second electrical connector part via means for conducting current.

5. The electronic price label according to claim 1, further comprising conductors arranged in the battery or in connection with the battery.

6. The electronic price label according to claim 1, wherein at least one connection pole of the battery is in wireless electrical contact with the electronic price label.

7. The electronic price label according to claim 6, further comprising a primary loop or primary winding in connection with the battery and a secondary loop or secondary winding in connection with the frame part.

8. The electronic price label according to claim 1, wherein a surface of the frame part is essentially planar and the battery unit is adapted to be fastened onto the essentially planar surface of the frame part.

9. The electronic price label according to claim 1, wherein the first fastener further includes a magnetic lock.

10. The electronic price label according to claim 1, wherein a second end of the stud or spike is arranged to be of essentially semicircular shape.

11. The electronic price label according to claim 1, wherein the stud or spike and a magnetic lock fasten the battery to the frame part.

12. The electronic price label according to claim 1, wherein the battery unit comprises a protective casing of the battery, which protective casing forms a recess for the battery.

13. The electronic price label according to claim 1, wherein the battery unit further comprises an intermediate part, which is adapted to be fastened between the battery and the frame part of the electronic price label.

14. The electronic price label according to claim 13, wherein the intermediate part, the battery and a protective casing of the battery are fixed to each other.

15. The electronic price label according to claim 13, further comprising a second fastener for fastening the intermediate part to the protective casing.

16. The electronic price label according to claim 15, further comprising a third fastener for fastening the frame part to the intermediate part.

17. The electronic price label according to claim 13, further comprising a second fastener for fastening the intermediate part to the protective casing and a third fastener for fastening the intermediate part to the frame part.

18. The electronic price label according to claim 13, wherein the price label further comprises fastening means for fastening the intermediate part to a protective casing and a fastening means for fastening the intermediate part to the protective casing is arranged in the structure of the protective casing or in connection with the protective casing and/or in the structure of the intermediate part or in connection with the intermediate part.

19. The electronic price label according to claim 5, wherein at least one of the conductors is a spring.

20. The electronic price label according to claim 1, wherein the electronic price label further comprises a remotely readable identifier.

21. The electronic price label according to claim 20, wherein the remotely readable identifier is arranged in connection with the battery unit.

22. The electronic price label according to claim 1, further comprising a memory, which is adapted to retain information when the current is disconnected.

23. The electronic price label according to claim 2, wherein the first electrical connector part and the second electrical connector part are adapted to conduct current from the connection poles of the battery to a circuit board or a display of the electronic price label.

24. The electronic price label according to claim 1, further comprising a solar cell connected to the protective casing to charge the battery.

* * * * *